US011210520B2

United States Patent
Richter et al.

(10) Patent No.: US 11,210,520 B2
(45) Date of Patent: Dec. 28, 2021

(54) METHOD AND DEVICE FOR PRESENTING SYNTHESIZED REALITY CONTENT IN ASSOCIATION WITH RECOGNIZED OBJECTS

(71) Applicant: Apple Inc., Cupertino, CA (US)

(72) Inventors: Ian M. Richter, Los Angeles, CA (US); Mohamed Selim Ben Himane, Milpitas, CA (US); Peter Meier, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/959,253

(22) PCT Filed: Jan. 18, 2019

(86) PCT No.: PCT/US2019/014288
§ 371 (c)(1),
(2) Date: Jun. 30, 2020

(87) PCT Pub. No.: WO2019/144000
PCT Pub. Date: Jul. 25, 2019

(65) Prior Publication Data
US 2020/0342231 A1    Oct. 29, 2020

Related U.S. Application Data

(60) Provisional application No. 62/734,065, filed on Sep. 20, 2018, provisional application No. 62/620,339, filed on Jan. 22, 2018.

(51) Int. Cl.
*G06K 9/00* (2006.01)
*G06T 7/70* (2017.01)
*G06T 11/00* (2006.01)

(52) U.S. Cl.
CPC ............ *G06K 9/00671* (2013.01); *G06T 7/70* (2017.01); *G06T 11/00* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

2012/0075343 A1* 3/2012 Chen ........................ G06T 7/73
345/633
2014/0146084 A1    5/2014 Polo et al.
(Continued)

FOREIGN PATENT DOCUMENTS

EP            2657882 A1    10/2013

OTHER PUBLICATIONS

International Search Report and Written Opinion dated Apr. 8, 2019, International Application No. PCT/US2019/014288, pp. 1-13.
(Continued)

*Primary Examiner* — Jeffrey J Chow
(74) *Attorney, Agent, or Firm* — Fernando & Partners, LLP

(57) ABSTRACT

In one implementation, a method includes: obtaining image data from an image sensor; recognizing a portion of an object within the image data; obtaining synthesized reality (SR) content—such as mixed reality, augmented reality, augmented virtuality, or virtual reality content—associated with the portion of the object; and displaying the SR content in association with the portion of the object. In some implementations, the SR content is dependent on the orientation of an electronic device or the user relative to the object. In some implementations, the SR content is generated based on sensor data associated with the object.

39 Claims, 11 Drawing Sheets

(56) References Cited

U.S. PATENT DOCUMENTS

| | | |
|---|---|---|
| 2014/0267406 A1* | 9/2014 | Mullins ................ G06T 19/006 |
| | | 345/633 |
| 2017/0061700 A1* | 3/2017 | Urbach .................. G06F 3/011 |
| 2017/0103584 A1* | 4/2017 | Vats ........................ G10L 15/22 |
| 2017/0208256 A1 | 7/2017 | Lin et al. |
| 2017/0243400 A1 | 8/2017 | Skidmore |

OTHER PUBLICATIONS

Michael Gervautz et al., "Anywhere Interfaces Using Handheld Augmented Reality", Computer, vol. 45, No. 7, Feb. 2012, pp. 26-31.

* cited by examiner

METHOD AND DEVICE FOR PRESENTING SYNTHESIZED REALITY CONTENT IN ASSOCIATION WITH RECOGNIZED OBJECTS

TECHNICAL FIELD

The present disclosure generally relates to synthesized reality (SR) content consumption, and in particular, to systems, methods, and devices for presenting SR content in associated with recognized objects.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience AR content superimposed on a live video feed of the user's setting on a handheld display (e.g., an AR-enabled mobile phone or tablet with video pass-through). As another example, a user may experience AR content by wearing a head-mounted device (HMD) or head-mounted enclosure that still allows the user to see his/her surroundings (e.g., glasses with optical see-through). As yet another example, a user may experience VR content by using an HMD that encloses the user's field-of-view and is tethered to a computer.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
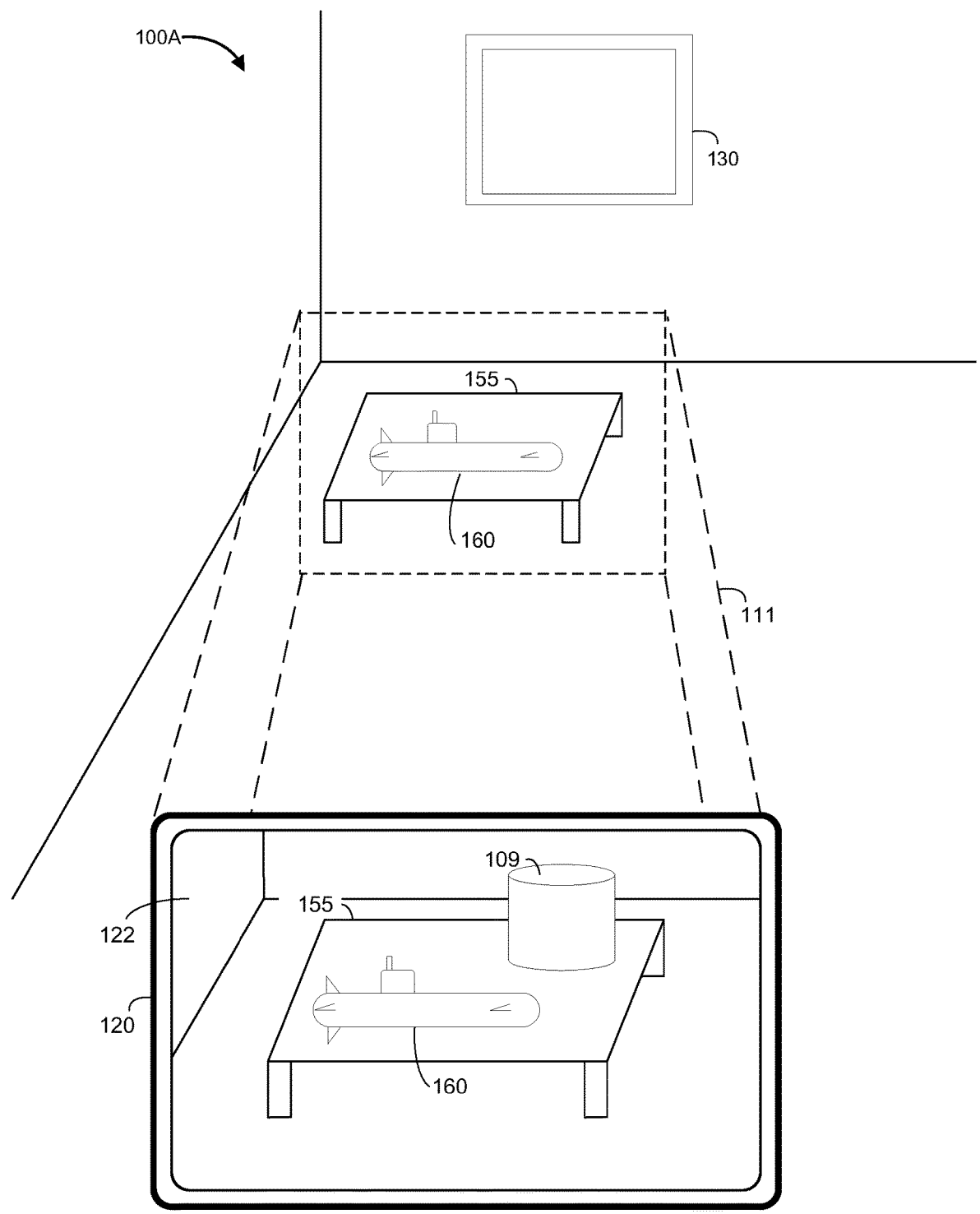
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting synthesized reality (SR) content in associated with recognized objects. According to some implementations, the method is performed at a device including non-transitory memory and one or more processors coupled with the non-transitory memory. The method includes: obtaining image data from an image sensor; recognizing a portion of an object within the image data; obtaining SR content associated with the portion of the object; and displaying the SR content in association with the portion of the object.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Today a user is able to drag-and-drop synthesized reality (SR) content onto a user interface so that the SR content is overlaid on his/her physical setting. However, the SR content is often selected by the user from a library of existing SR content. In contrast, a user may wish to view SR content that is context sensitive (e.g., based on objects recognized in the physical setting). As such, the disclosed implementations detect an object within a physical setting and present SR on or around the object, wherein the SR content is associated with the object.

To this end, SR content may be superimposed on an object in order to provide a cutaway or "x-ray" view into the object. In some implementations, the SR content is obtained from a library of SR content associated with the object (e.g., a cutaway or exploded view of an object, video content associated with the object, or the like). As such, for example, the user is able to see SR content associated with the object superimposed on the object. In some implementations, the SR content is generated based on sensor data associated with the object (e.g., sensors integrated with or embedded within the object such as automobile sensors) and/or environmental sensors (e.g., electromagnetic waves penetrating a building or wind gusts striking a tree or building). As such, for example, the user is able to see live SR content associated with the object or the setting around the object. In some implementations, the SR content is selected based on the user's or devices' orientation/location relative to the object (e.g., device or camera pose). As such, for example, the user may see different SR content associated with the object when looking at an object from a top-down view as opposed to a perspective view.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120 and an optional display device 130.

In some implementations, the electronic device 120 is configured to present the SR experience to a user. In some implementations, the electronic device 120 includes a suitable combination of software, firmware, and/or hardware. The electronic device 120 is described in greater detail below with respect to FIG. 3. According to some implementations, the electronic device 120 presents a synthesized reality (SR) experience to the user while the user is physically present within a physical setting 105 that includes an object 160 (e.g., a physical model, toy, or other volumetric item) on a table 155 within the field-of-view 111 of the electronic device 120. As such, in some implementations, the user holds the electronic device 120 in his/her hand(s). In some implementations, while presenting an augmented reality (AR) experience, the electronic device 120 is configured to present AR content (e.g., an AR cylinder 109) and to enable video pass-through of the physical setting 105 (e.g., including the object 160 and the table 155) on a display 122.

In some implementations, the display device 130 is configured to present media content (e.g., video and/or audio content) to the user. In some implementations, the display device 130 corresponds to a television or a computing device such as a desktop computer, kiosk, laptop computer, tablet, mobile phone, wearable computing device, or the like. In some implementations, the display device 130 includes a suitable combination of software, firmware, and/or hardware. The display device 130 is described in greater detail below with respect to FIG. 4.

Figure 1B:
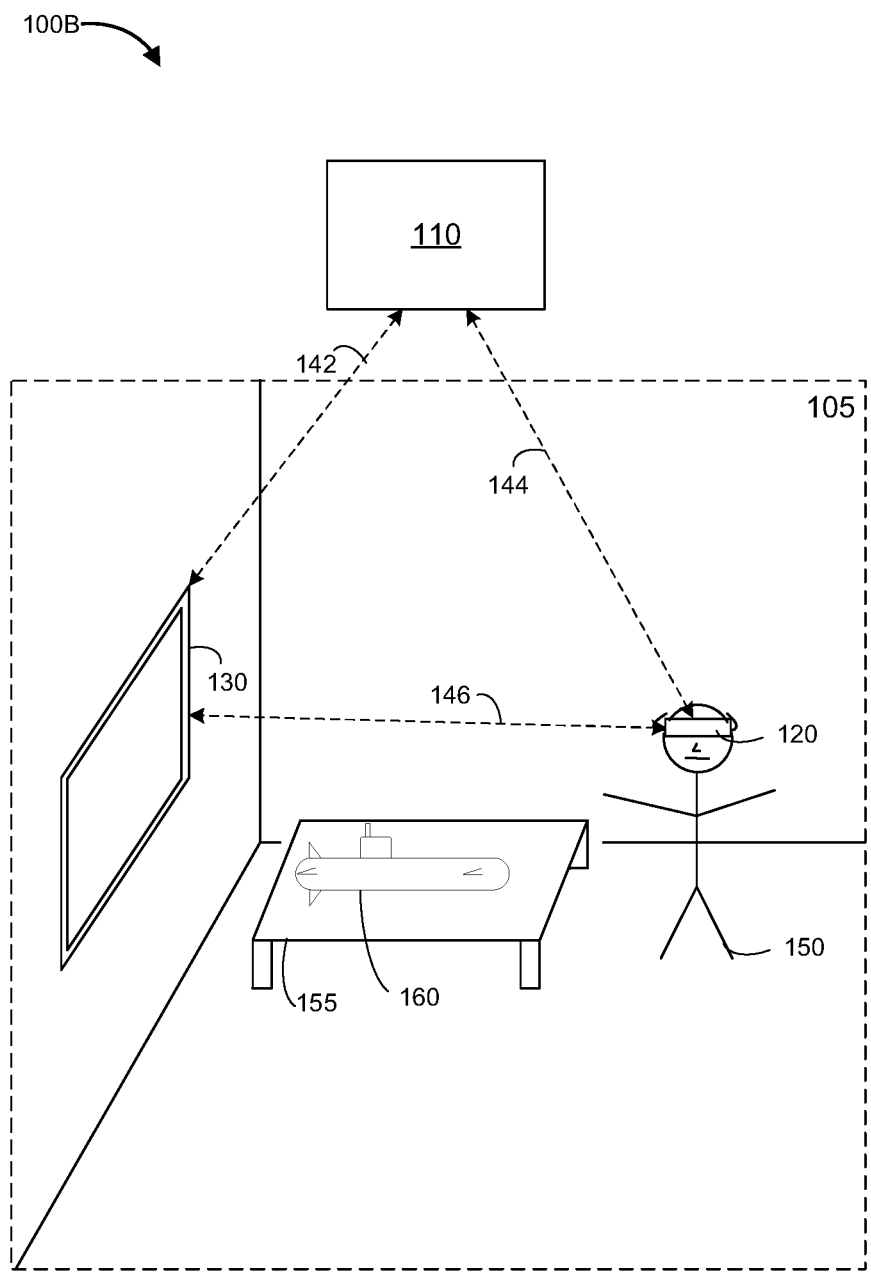
FIG. 1B is a block diagram of another example operating architecture in accordance with some implementations.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100B includes a controller 110, an electronic device 120, and an optional display device 130.

In some implementations, the controller 110 is configured to manage and coordinate an SR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical setting 105. For example, the controller 110 is a local server located within the physical setting 105. In another example, the controller 110 is a remote server located outside of the physical setting 105 (e.g., a cloud server, central server, etc.).

In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the controller 110 is communicatively coupled with the display device 130 via one or more wired or wireless communication channels 142 (e.g., BLUETOOTH, IEEE 802.11x, IEEE 802.16x, IEEE 802.3x, etc.). In some implementations, the electronic device 120 is communicatively coupled with the display device 130 via one or more wired or wireless communication channels 146 (e.g., BLUETOOTH, IEEE 802.11x, IEEE 802.16x, IEEE 802.3x, etc.).

In some implementations, the electronic device 120 is configured to present the SR experience to the user 150. In some implementations, the electronic device 120 includes a suitable combination of software, firmware, and/or hardware. The electronic device 120 is described in greater detail below with respect to FIG. 3. In some implementations, the functionalities of the controller 110 and/or the display device 130 are provided by and/or combined with the electronic device 120.

According to some implementations, the electronic device 120 presents a synthesized reality (SR) experience to the user 150 while the user 150 is virtually and/or physically present within a physical setting 105 that includes an object 160 (e.g., a physical model, toy, or other volumetric item) on a table 155. In some implementations, while presenting an augmented reality (AR) experience, the electronic device 120 is configured to present AR content and to enable optical see-through of the physical setting 105. In some implementations, while presenting a virtual reality (VR) experience, the electronic device 120 is configured to present VR content and to optionally enable video pass-through of the physical setting 105.

In some implementations, the user 150 wears the electronic device 120 on his/her head such as a head-mounted device (HMD). As such, the electronic device 120 includes one or more displays provided to display the SR content. For example, the electronic device 120 encloses the field-of-view of the user 150. As another example, the electronic device 120 slides into or otherwise attaches to a head mounted enclosure. In some implementations, the electronic device 120 is replaced with an SR chamber, enclosure, or room configured to present SR content in which the user 150 does not wear the electronic device 120.

In some implementations, the display device 130 is configured to present media content (e.g., video and/or audio content) to the user 150. In some implementations, the display device 130 corresponds to a television or a computing device such as a desktop computer, kiosk, laptop computer, tablet, mobile phone, wearable computing device, or the like. In some implementations, the display device 130 includes a suitable combination of software, firmware, and/or hardware. The display device 130 is described in greater detail below with respect to FIG. 4.

Figure 2:
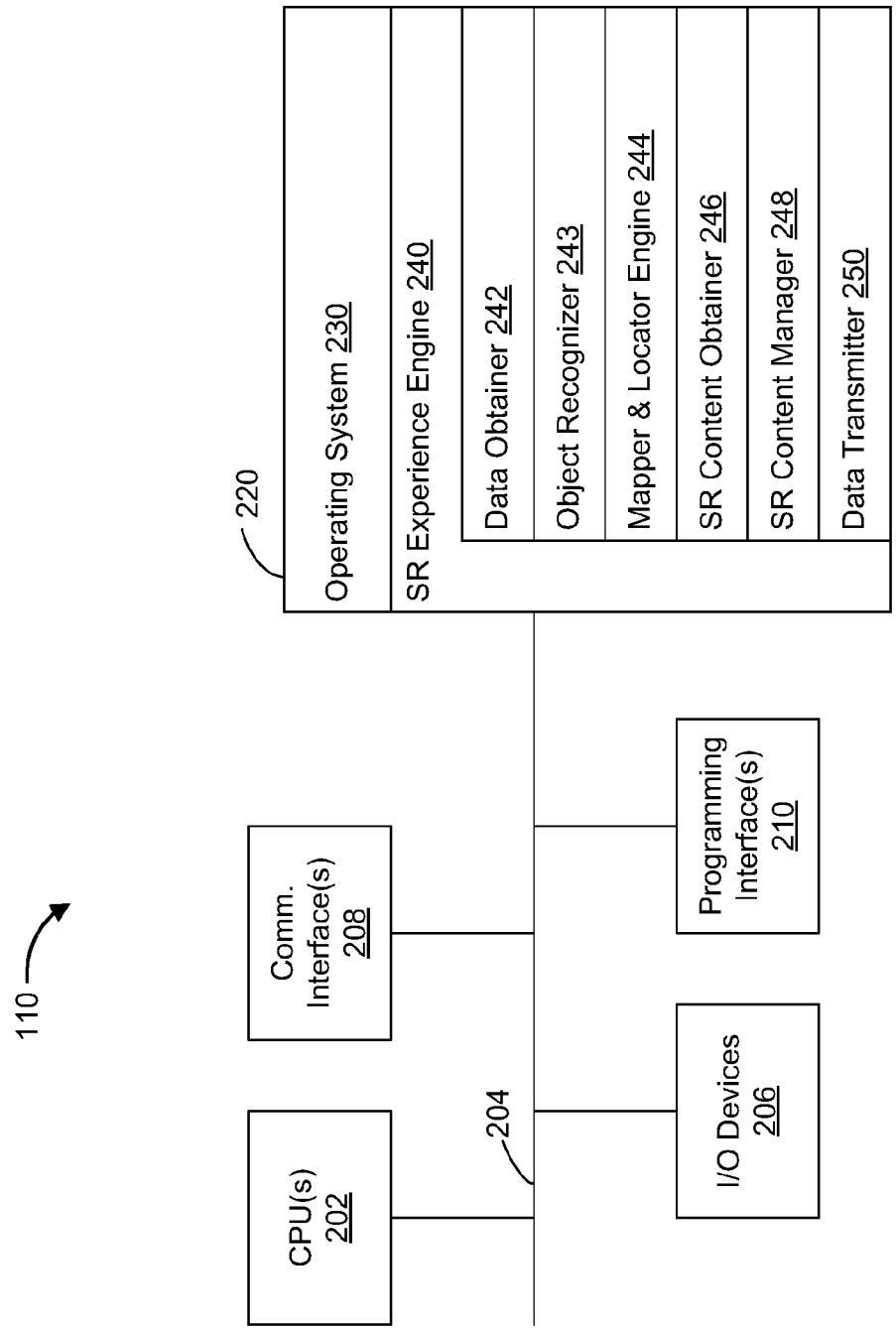
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a synthesized reality (SR) experience engine 240.

The operating system 230 includes procedures for handling various basic system services and for performing hardware dependent tasks. In some implementations, the SR experience engine 240 is configured to manage and coordinate one or more SR experiences for one or more users (e.g., a single SR experience for one or more users, or multiple SR experiences for respective groups of one or more users). To that end, in various implementations, the SR experience engine 240 includes a data obtainer 242, an object recognizer 243, a mapper and locator engine 244, an SR content obtainer 246, an SR content manager 248, and a data transmitter 250.

In some implementations, the data obtainer 242 is configured to obtain data (e.g., presentation data, user interaction data, sensor data, location data, etc.) from at least one of sensors in the physical setting 105, sensors associated with the controller 110, the electronic device 120, and the display device 130. For example, the data obtainer 242 obtains sensor data from the electronic device 120 that includes image data from external facing image sensors of the electronic device 120, wherein the image data corresponds to images or a video stream capturing the physical setting 105. To that end, in various implementations, the data obtainer 242 includes instructions and/or logic therefor, and heuristics and metadata therefor.

In some implementations, the object recognizer 243 is configured to recognize objects within the physical setting 105 based on image data from the electronic device 120 or other image sensors within the physical setting 105. To that end, in various implementations, the object recognizer 243 includes instructions and/or logic therefor, and heuristics and metadata therefor.

In some implementations, the mapper and locator engine 244 is configured to map the physical setting 105 and to track the position/location of the electronic device 120 or the user 150 with respect to the physical setting 105. In some implementations, the mapper and locator engine 244 is also configured to determine the orientation of the electronic device 120 or the user 150 (e.g., device or camera pose) relative to one or more reference points (e.g., the object 160) in the physical setting (e.g., the center of mass of the object 160 or another point on the object 160). According to some implementations, the mapper and locator engine 244 determines the orientation of the electronic device 120 relative to the object based on the techniques described in U.S. Provisional Patent Application No. 62/556,849, filed Sep. 11, 2017, which is incorporated herein in its entirety. To that end, in various implementations, the mapper and locator engine 244 includes instructions and/or logic therefor, and heuristics and metadata therefor.

In some implementations, the SR content obtainer 246 is configured to obtain (e.g., receive, retrieve, or generate) SR content associated with objects recognized within the physical setting 105. To that end, in various implementations, the SR content obtainer 246 includes instructions and/or logic therefor, and heuristics and metadata therefor.

In some implementations, the SR content manager 248 is configured to manage and coordinate the presentation of the SR in association with an object recognized within the physical setting 105 as the orientation of the user or electronic device 120 changes relative to the recognized object 160. To that end, in various implementations, the SR content manager 248 includes instructions and/or logic therefor, and heuristics and metadata therefor.

In some implementations, the data transmitter 250 is configured to transmit data (e.g., presentation data, location data, etc.) to at least one of the electronic device 120 and the display device 130. To that end, in various implementations, the data transmitter 250 includes instructions and/or logic therefor, and heuristics and metadata therefor.

Although the data obtainer 242, the object recognizer 243, the mapper and locator engine 244, the SR content obtainer 246, the SR content manager 248, and the data transmitter 250 are shown as residing on a single device (e.g., the controller 110), it should be understood that in other implementations, any combination of the data obtainer 242, the object recognizer 243, the mapper and locator engine 244, the SR content obtainer 246, the SR content manager 248, and the data transmitter 250 may be located in separate computing devices.

Moreover, FIG. 2 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
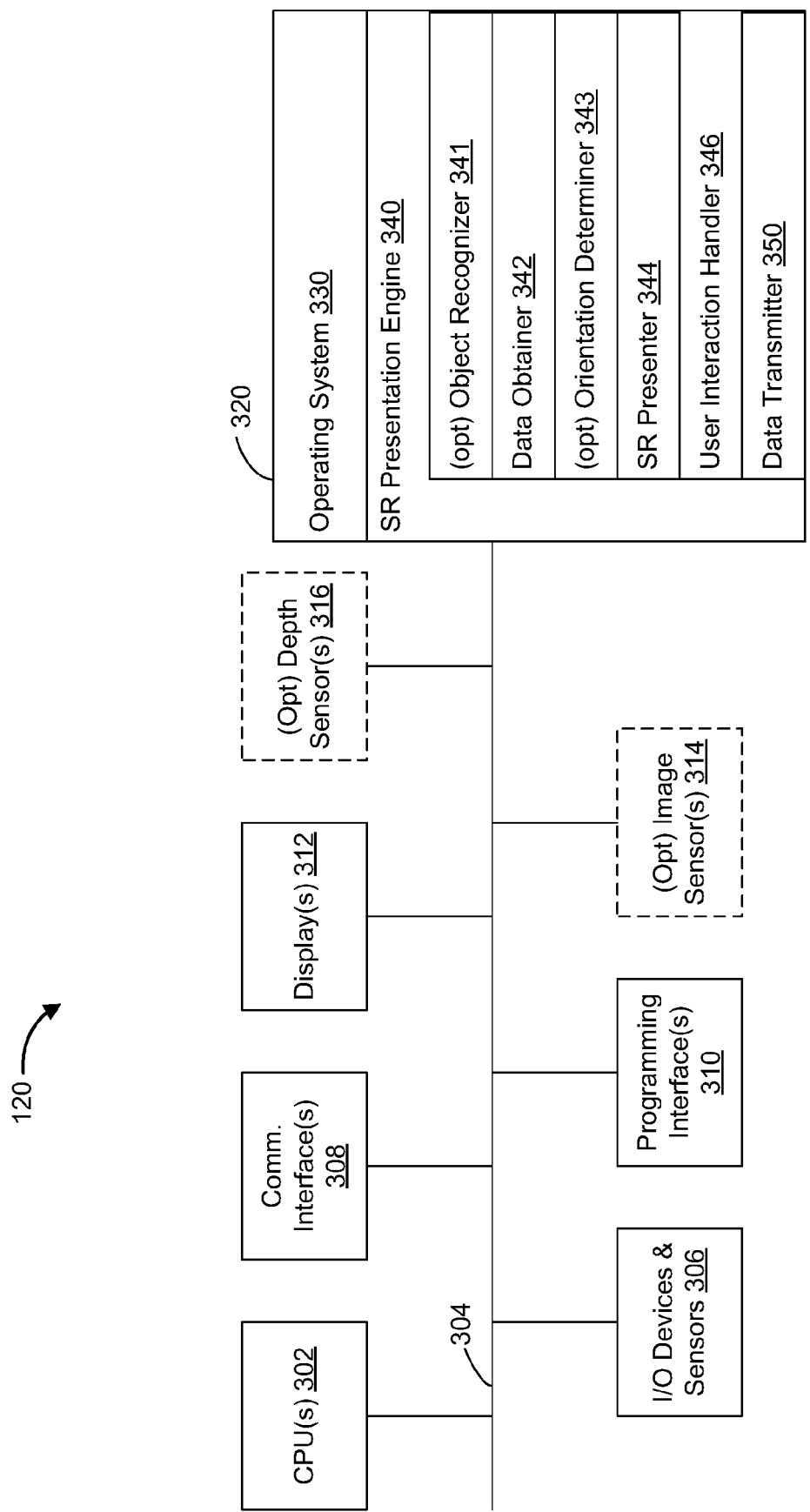
FIG. 3 is a block diagram of an example head-mounted device (HMD) in accordance with some implementations.

FIG. 3 is a block diagram of an example of the electronic device 120 (e.g., an HMD, mobile phone, or tablet) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior and/or exterior facing image sensors 314, one or more optional depth sensors 316, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 312 are configured to present the SR experience to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical setting 105). In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional image sensors 314 are configured to obtain image data that corresponds to at least a portion of the face of the user that includes the eyes of the user. For example, the one or more optional image sensors 314 correspond to one or more RGB cameras (e.g., with a complementary metal-oxide-semiconductor (CMOS) image sensor or a charge-coupled device (CCD) image sensor), infrared (IR) image sensors, event-based cameras, and/or the like.

In some implementations, the one or more optional depth sensors 316 are configured to obtain depth data that corresponds to at least a portion of the face of the user and to synthesize a depth/mesh map of the face of the user, where the mesh map characterizes the facial topography of the user. For example, the one or more optional depth sensors 316 correspond to a structured light device, a time-of-flight device, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation engine 340.

The operating system 330 includes procedures for handling various basic system services and for performing hardware dependent tasks. In some implementations, the SR presentation engine 340 is configured to present SR content to the user via the one or more displays 312. To that end, in various implementations, the SR presentation engine 340 includes an optional object recognizer 341, a data obtainer 342, an optional orientation determiner 343, an SR presenter 344, a user interaction handler 346, and a data transmitter 350.

In some implementations, the optional object recognizer 341 is configured to recognize objects within the physical setting 105 based on image data from the one or more image sensors 314 (e.g., external facing image sensors). To that end, in various implementations, the object recognizer 341 includes instructions and/or logic therefor, and heuristics and metadata therefor.

In some implementations, the data obtainer 342 is configured to obtain data (e.g., presentation data, user interaction data, sensor data, location data, etc.) from at least one of sensors in the physical setting 105, sensors associated with the electronic device 120, the controller 110, and the display device 130. To that end, in various implementations, the data obtainer 342 includes instructions and/or logic therefor, and heuristics and metadata therefor.

In some implementations, the optional orientation determiner 343 is configured to determine the orientation of the electronic device 120 or the user 150 relative to one or more reference points (e.g., the object) in the physical setting (e.g., the center of mass of the object 160 or another point on the object 160). For example, in some implementations, the orientation determiner 343 determines the orientation of the electronic device 120 relative to the object based on the techniques described in U.S. Provisional Patent Application No. 62/556,849, filed Sep. 11, 2017, which is incorporated herein in its entirety. To that end, in various implementations, the orientation determiner 343 includes instructions and/or logic therefor, and heuristics and metadata therefor.

In some implementations, the SR presenter 344 is configured to present SR content via the one or more displays 312. In some implementations, the SR presenter 344 is also configured to present flat video content via the one or more displays 312. To that end, in various implementations, the SR presenter 344 includes instructions and/or logic therefor, and heuristics and metadata therefor.

In some implementations, the user interaction handler 346 is configured to detect and interpret user interactions with the presented SR content. To that end, in various implementations, the user interaction handler 346 includes instructions and/or logic therefor, and heuristics and metadata therefor.

In some implementations, the data transmitter 350 is configured to transmit data (e.g., presentation data, location data, user interaction data, etc.) to at least one of the controller 110 and the display device 130. To that end, in various implementations, the data transmitter 350 includes instructions and/or logic therefor, and heuristics and metadata therefor.

Although the optional object recognizer 341, the data obtainer 342, the optional orientation determiner 343, the SR presenter 344, the user interaction handler 346, and the data transmitter 350 are shown as residing on a single device (e.g., the electronic device 120), it should be understood that in other implementations, any combination of the optional object recognizer 341, the data obtainer 342, the optional orientation determiner 343, the SR presenter 344, the user interaction handler 346, and the data transmitter 350 may be located in separate computing devices.

Moreover, FIG. 3 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
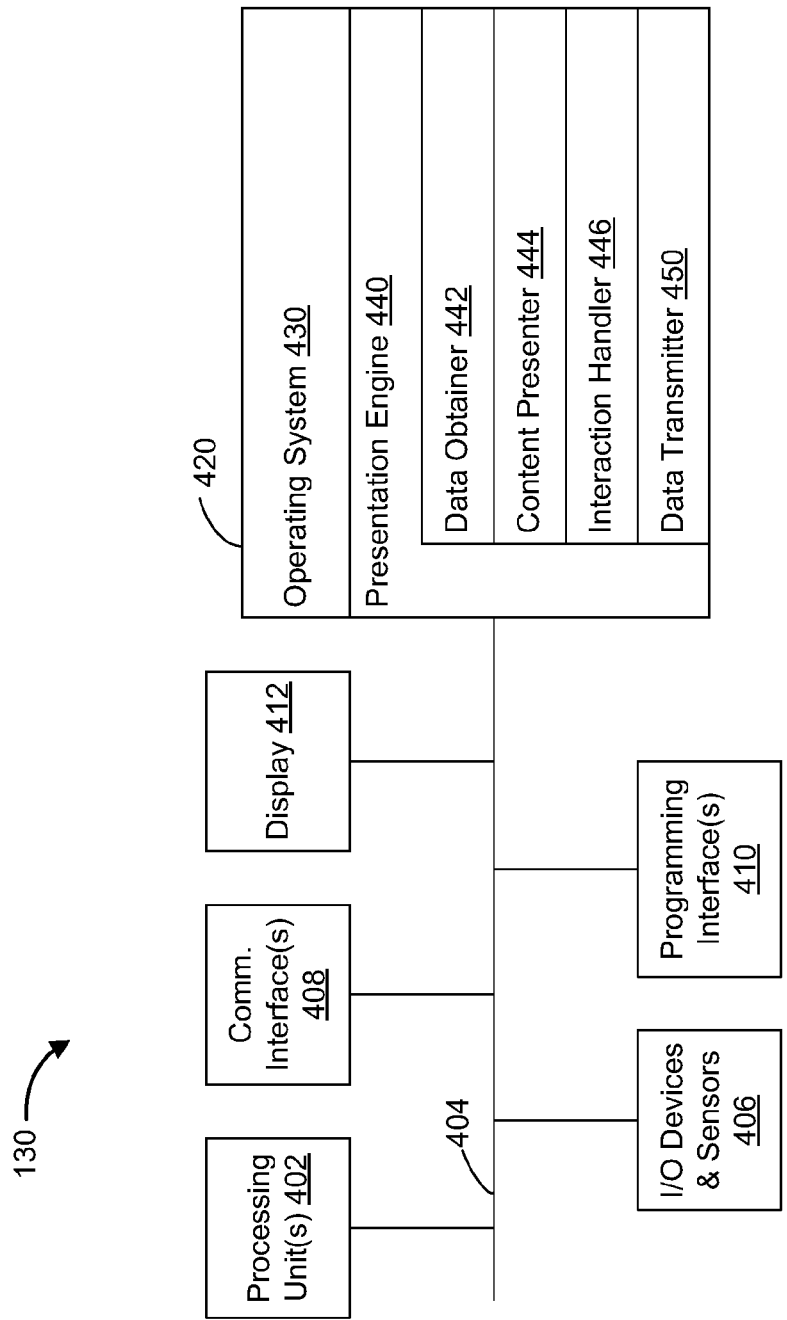
FIG. 4 is a block diagram of an example optional display device in accordance with some implementations.

FIG. 4 is a block diagram of an example of the optional display device 130 (e.g., a television (TV) or other display within the physical setting 105) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the display device 130 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, a display 412, a memory 420, and one or more communication buses 404 for interconnecting these and various other components. In some implementations, the display device 130 is optionally controlled by a remote-control device, voice commands, the electronic device 120, or the like.

In some implementations, the one or more communication buses 404 include circuitry that interconnects and controls communications between system components. In some implementations, the one or more I/O devices and sensors 406 include at least one of one or more IR sensors, one or more physical buttons, one or more microphones, one or more speakers, one or more image sensors, one or more depth sensors, and/or the like.

In some implementations, the display 412 corresponds to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a presentation engine 440.

The operating system 430 includes procedures for handling various basic system services and for performing hardware dependent tasks. In some implementations, the presentation engine 440 is configured to present media content (e.g., video and/or audio content) to users via the display 412 and the one or more I/O devices and sensors 406 (e.g., one or more speakers). To that end, in various implementations, the presentation engine 440 includes a data obtainer 442, a content presenter 444, an interaction handler 446, and a data transmitter 450.

In some implementations, the data obtainer 442 is configured to obtain data (e.g., presentation data, user interaction data, etc.) from at least one of sensors in the physical setting 105, sensors associated with the display device 130, the controller 110, and the electronic device 120. To that end, in various implementations, the data obtainer 442 includes instructions and/or logic therefor, and heuristics and metadata therefor.

In some implementations, the content presenter 444 is configured to render and display video content via the display 412. To that end, in various implementations, the content presenter 444 includes instructions and/or logic therefor, and heuristics and metadata therefor.

In some implementations, the interaction handler 446 is configured to detect and interpret user interactions with the display device 130 (e.g., navigation, playback, tuning, volume adjustment, or the like commands). To that end, in various implementations, the interaction handler 446 includes instructions and/or logic therefor, and heuristics and metadata therefor.

In some implementations, the data transmitter 450 is configured to transmit data (e.g., presentation data, user interaction data, etc.) to at least one of the controller 110 and the electronic device 120. To that end, in various implementations, the data transmitter 450 includes instructions and/or logic therefor, and heuristics and metadata therefor.

Although the data obtainer 442, the content presenter 444, the interaction handler 446, and the data transmitter 450 are shown as residing on a single device (e.g., the display device 130), it should be understood that in other implementations, any combination of the data obtainer 442, the content presenter 444, the interaction handler 446, and the data transmitter 450 may be located in separate computing devices.

Moreover, FIG. 4 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 5A:
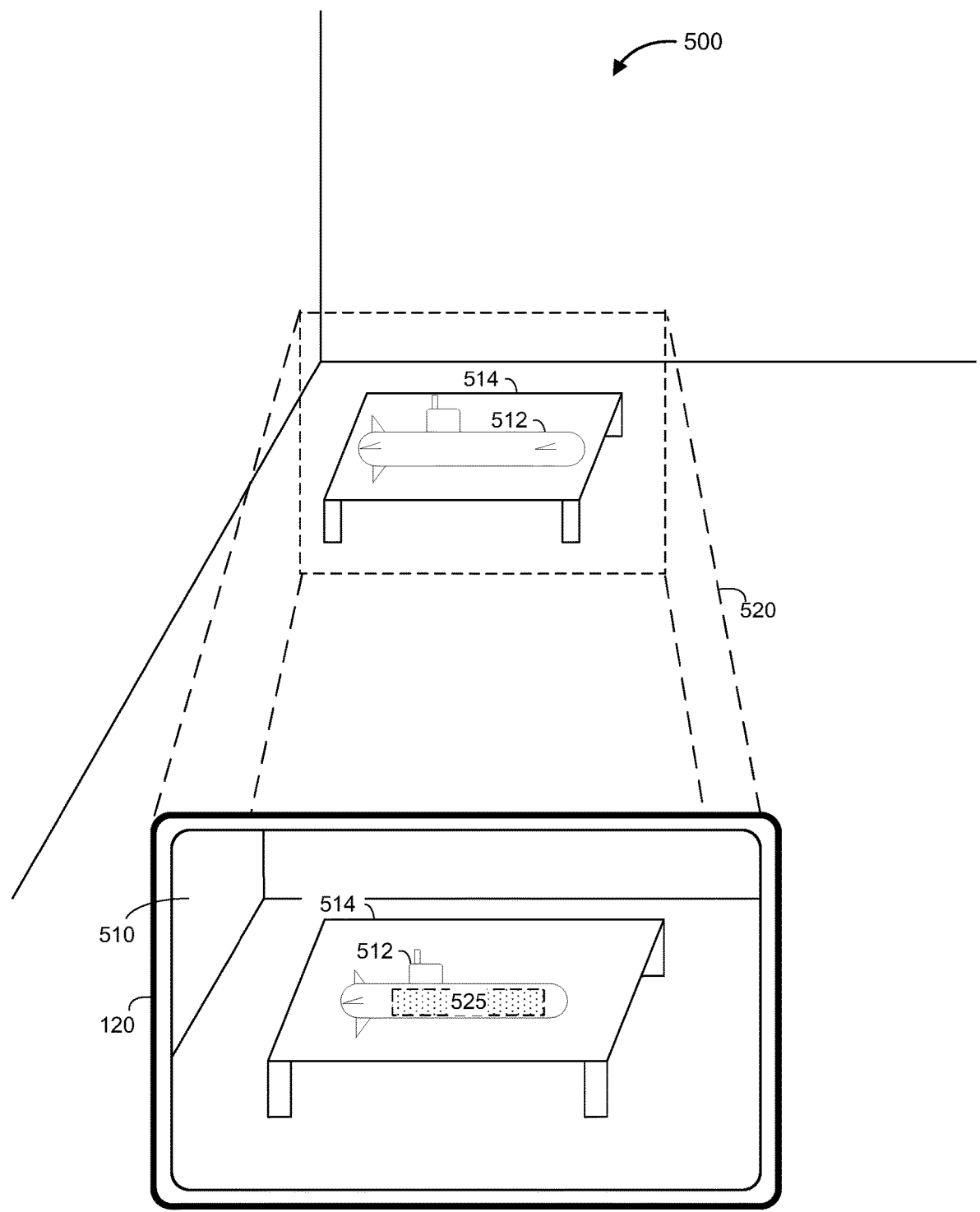
FIGS. 5A-5B illustrate example synthesized reality (SR) presentation scenarios in accordance with some implementations.
Figure 5B:
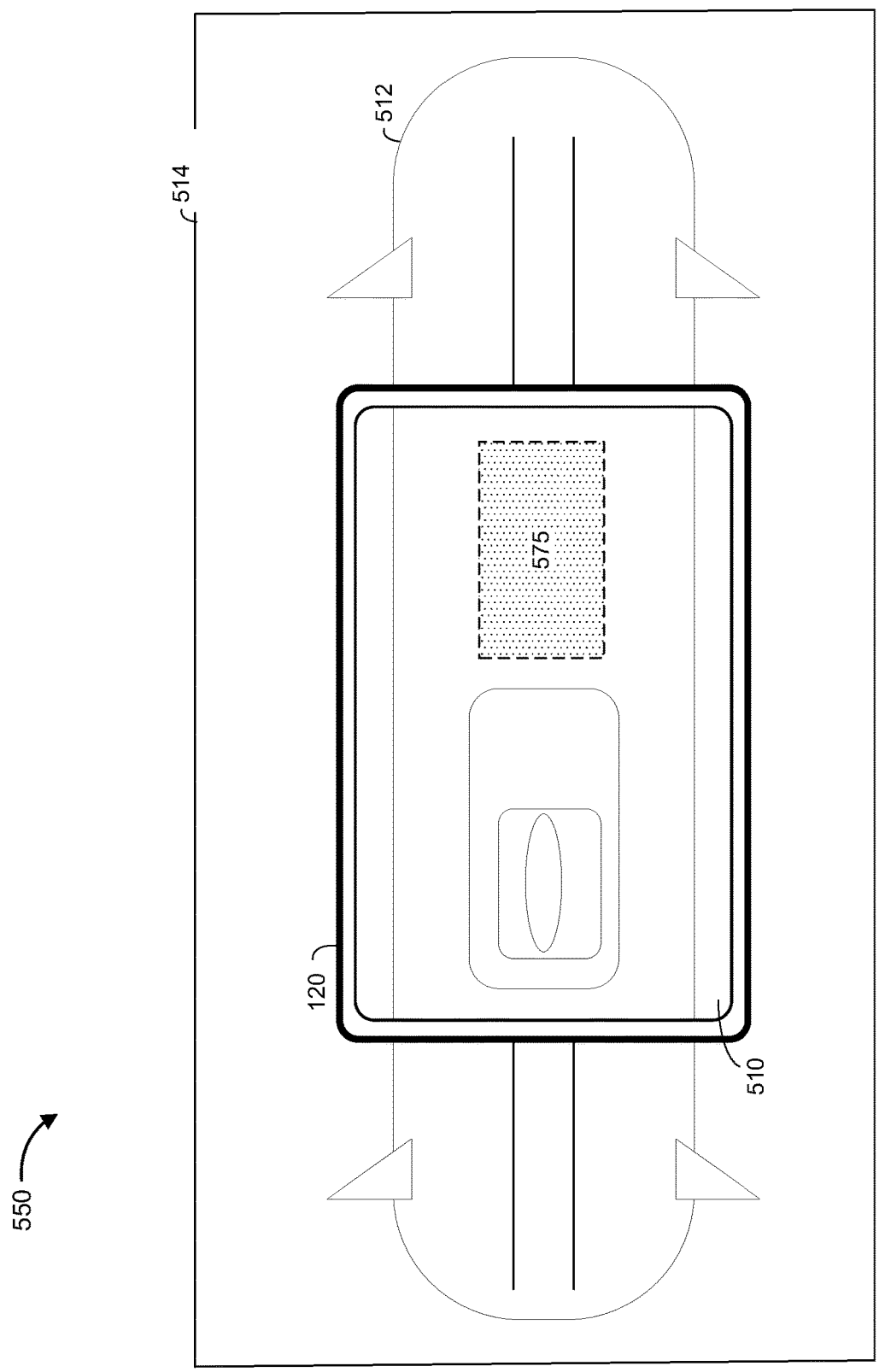

FIGS. 5A-5B illustrate example SR presentation scenarios 500 and 550 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 5A illustrates an example SR presentation scenario 500. As shown in FIG. 5A, the physical setting 505 includes a model submarine 512 sitting on a table 514. In this example, a portion of the physical setting 505 is within the field-of-view 520 of the electronic device 120, where the field-of-view 520 is associated with an external facing image sensor of the electronic device 120 (e.g., a tablet or mobile phone). In other words, the user is looking at the model submarine 412 from a side or perspective orientation through the electronic device 120. As such, the portion of the physical setting 505, including the model submarine 512 sitting on the table 514, is displayed on the display 510 of the electronic device 120 (e.g., a live video stream or video pass-through of the physical setting 505). As shown in FIG. 5A, the electronic device 120 superimposes AR content 525 on the model submarine 512 according to the side or perspective orientation/view of the electronic device 120 relative to the model submarine 512. For example, the AR content 525 corresponds to an AR cutaway view of the model submarine 512 showing the various decks of the type of submarine associated with the model submarine 512 (e.g., a Russian Typhoon class).

FIG. 5B illustrates an example SR presentation scenario 550. As shown in FIG. 5B, the physical setting 505 includes a model submarine 512 sitting on a table 514. In this example, a portion of the physical setting 505 is within the field-of-view 520 of the electronic device 120 (not shown due to the top-down viewing angle), where the field-of-view 520 is associated with an external facing image sensor of the electronic device 120 (e.g., a tablet or mobile phone). In other words, the user is looking at the model submarine 412 from a top-down orientation through the electronic device 120. As such, the portion of the physical setting 505, including the model submarine 512 sitting on the table 514, is displayed on the display 510 of the electronic device 120 (e.g., a live video stream or video pass-through of the physical setting 505). As shown in FIG. 5B, the electronic device 120 superimposes AR content 575 on the model submarine 512 according to the top-down orientation/view of the electronic device 120 relative to the model submarine 512. For example, the AR content 575 corresponds to an AR cutaway view of the model submarine 512 showing vertical missile launch tubes associated with the model submarine 512.

According to some implementations, as shown in FIGS. 5A-5B, the AR content changes based on the orientation of the electronic device 120 relative to the object. In FIG. 5A, the electronic device 120 superimposes the AR content 525 on the model submarine 512 based on the side or perspective orientation of the electronic device 120 relative to the model submarine 512. In contrast, in FIG. 5B, the electronic device 120 superimposes the AR content 575 on the model submarine 512 based on the top-down orientation of the electronic device 120 relative to the model submarine 512. In some implementations, the AR content 525 and the AR content 575 correspond to the same AR content from different points-of-view. In some implementations, the AR content 525 and the AR content 575 correspond to different AR content based on the point-of-view of the electronic device 120.

Figure 6A:
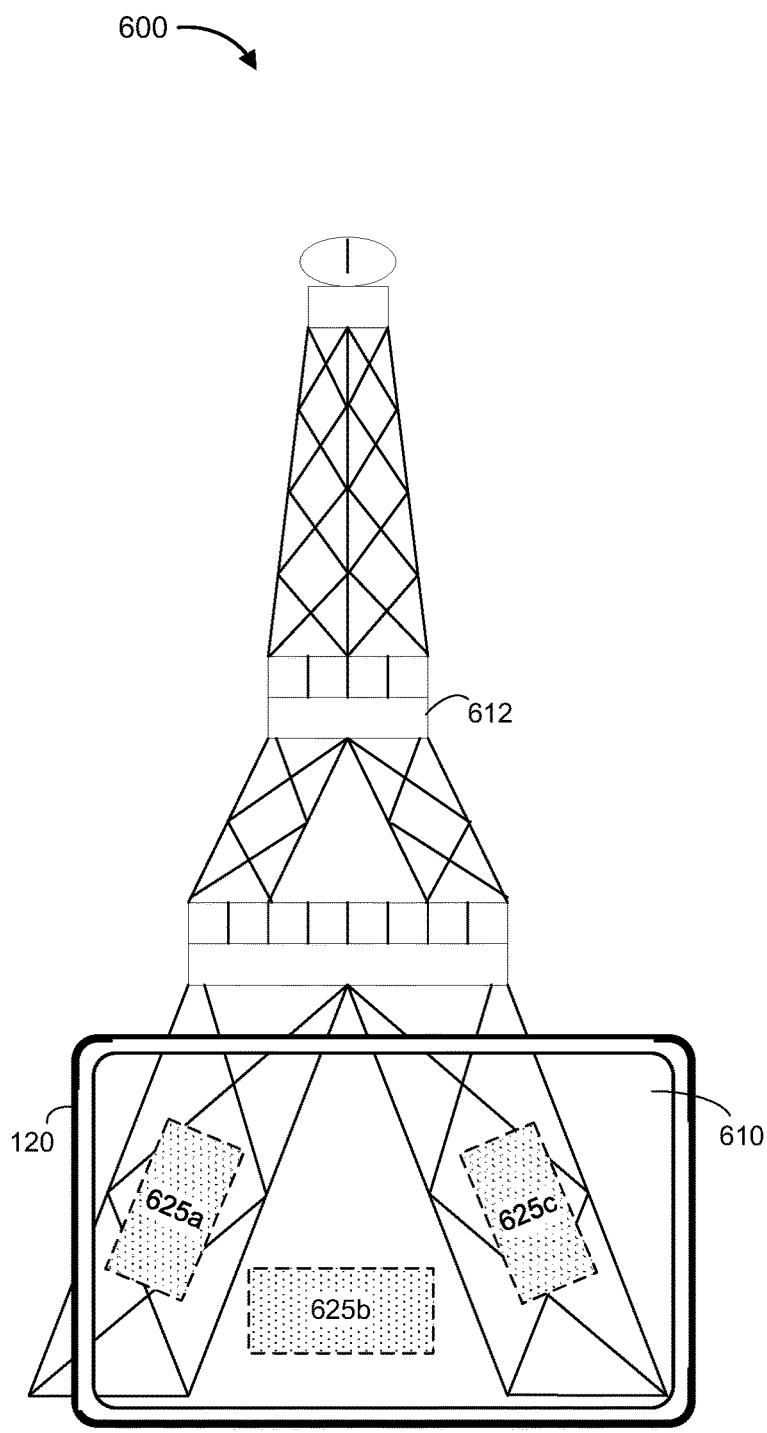
FIGS. 6A-6B illustrate example SR presentation scenarios in accordance with some implementations.
Figure 6B:
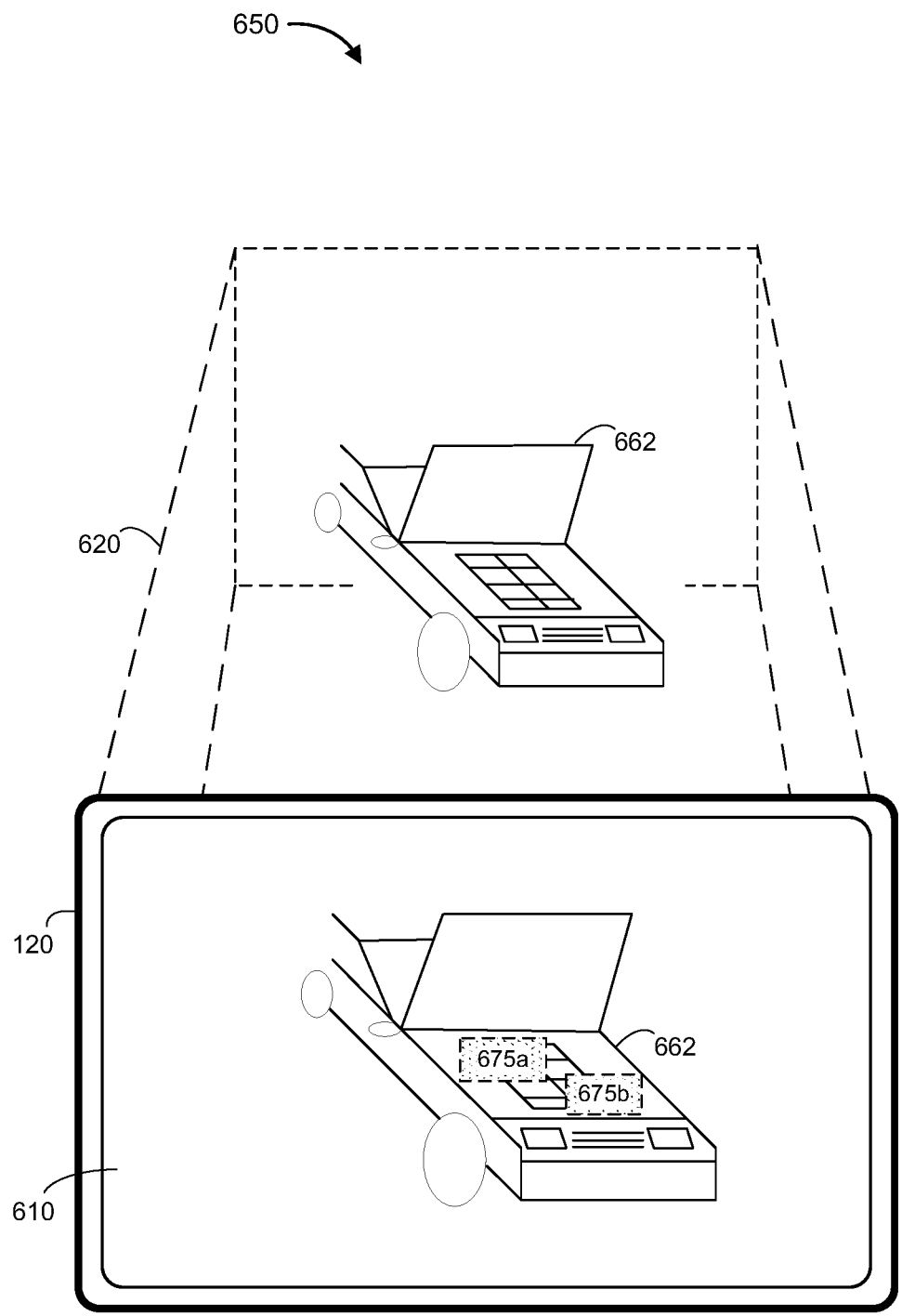

FIGS. 6A-6B illustrate example SR presentation scenarios 600 and 650 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 6A illustrates an example SR presentation scenario 600. As shown in FIG. 6A, the physical setting 605 includes the Eiffel Tower 612. In this example, a portion of the physical setting 605 is within the field-of-view 620 of the electronic device 120, where the field-of-view 620 is associated with an external facing image sensor of the electronic device 120 (e.g., a tablet or mobile phone). In other words, the user is looking at a portion of the Eiffel Tower 612 (e.g., the lower portion of the Eiffel Tower 612 below the first platform) from a side or perspective orientation through the electronic device 120. As such, the portion of the physical setting 605, including the lower portion of the Eiffel Tower 612, is displayed on the display 610 of the electronic device 120 (e.g., a live video stream or video pass-through of the physical setting 605).

According to some implementations, a user is able to see AR content superimposed on an object that is generated based on sensor data associated with the object and/or environmental sensors proximate to the object. As shown in FIG. 6A, the electronic device 120 displays AR content 625a, 625b, and 625c. For example, the AR content 625a superimposed on the Eiffel Tower 612 corresponds to a first elevator moving from the ground toward the first platform based on sensor data from the Eiffel Tower 612. For example, the AR content 625b corresponds to the crowd of people below the Eiffel Tower 612 or environmental statistics (e.g., wind speed, temperature, humidity, etc.) based on sensor data from sensors associated with the electronic device 120, sensors associated with the Eiffel Tower 612, or sensors within the physical setting 605. For example, the AR content 625c superimposed on the Eiffel Tower 612 corresponds to a second elevator moving from the first platform toward the ground based on sensor data from the Eiffel Tower 612.

FIG. 6B illustrates an example SR presentation scenario 650. As shown in FIG. 6B, the physical setting 655 includes an automobile 662. In this example, a portion of the physical setting 655 is within the field-of-view 620 of the electronic device 120, where the field-of-view 620 is associated with an external facing image sensor of the electronic device 120 (e.g., a tablet or mobile phone). In other words, the user is looking at a portion of the automobile 662 from a front orientation through the electronic device 120 (e.g., the engine compartment portion of the automobile 662). As such, the portion of the physical setting 655, including the engine compartment portion of the automobile 662, is displayed on the display 610 of the electronic device 120 (e.g., a live video stream or video pass-through of the physical setting 655).

According to some implementations, a user is able to see AR content superimposed on an object that is generated based on sensor data from the object. As shown in FIG. 6B, the electronic device 120 displays AR content 675a and 675b superimposed on the engine compartment portion of the automobile 662. For example, the AR content 675a superimposed on the engine compartment portion of the automobile 662 corresponds to an illustration of the working transmission of the automobile 662 based on sensor data from the automobile 662. For example, the AR content 675b superimposed on the engine compartment portion of the automobile 662 corresponds to an illustration of the working engine of the automobile 662 based on sensor data from the automobile 662.

Figure 7:
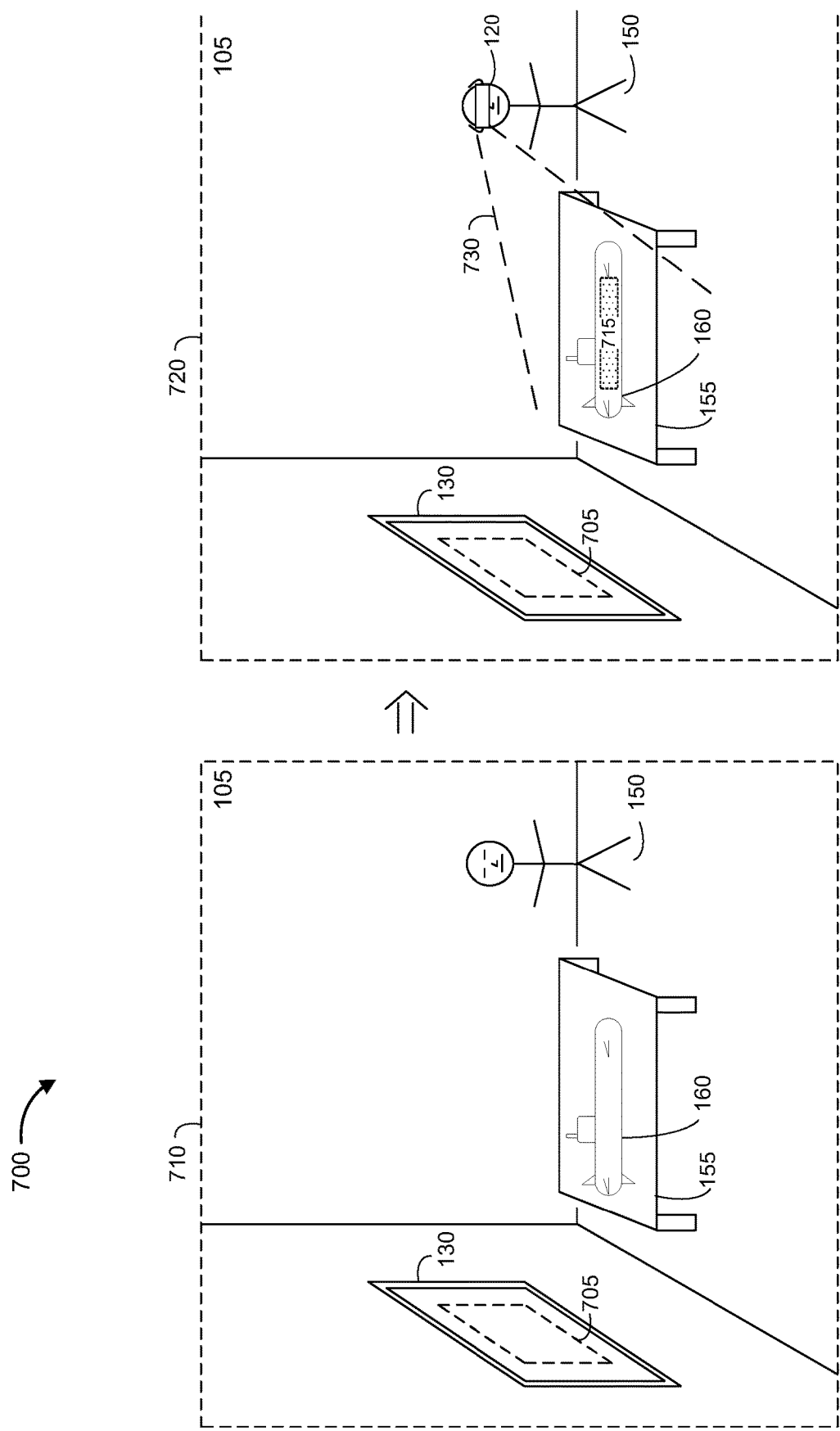
FIG. 7 illustrates an example SR presentation scenario in accordance with some implementations.

FIG. 7 illustrates an example SR presentation scenario 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

According to some implementations, a user is able to seamlessly switch between viewing a movie on a display device and an SR reconstruction thereof superimposed on a related physical object or model scene. As shown in FIG. 7, the physical setting 105 includes the display device 130, the user 150, and the model submarine 160 sitting on the table 155. In state 710 (e.g., time T), the user 150 is watching video content 705 (e.g., a television (TV) show or movie associated with a submarine crew) on the display device 130. In state 720 (e.g., time T+1), the user 150 is wearing the electronic device 120 (e.g., an HMD) on his/her head and viewing an SR reconstruction 715 of the video content 705 being presented on and/or around the model submarine 160. As such, in state 720, the user 150 is able to see video pass-through of the physical setting within his/her field-of-view 105 and also is being presented the SR reconstruction 715 of the video content 705 superimposed on and/or around the model submarine 160.

Figure 8:
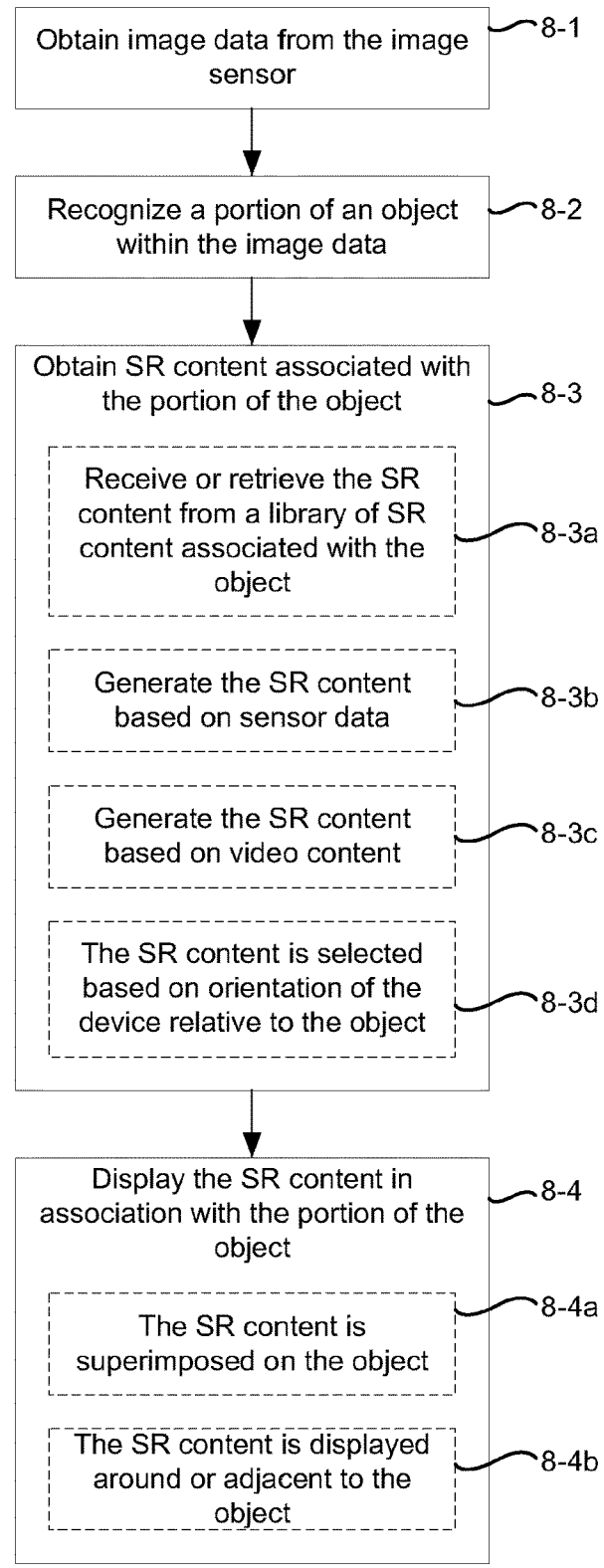
FIG. 8 is a flowchart representation of a method of presenting SR content in associated with recognized objects in accordance with some implementations.

FIG. 8 is a flowchart representation of a method 800 of presenting SR content in associated with recognized objects in accordance with some implementations. In various implementations, the method 800 is performed by a device with non-transitory memory and one or more processors coupled with the non-transitory memory (e.g., the controller 110 in FIGS. 1B and 2, the electronic device 120 in FIGS. 1A-1B and 3, or a suitable combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, in some circumstances, the method 800 includes: obtaining image data from an image sensor; recognizing a portion of an object within the image data; obtaining SR content associated with the portion of the object; and displaying the SR content in association with the portion of the object.

As represented by block 8-1, the method 800 includes obtaining image data from an image sensor. In some implementations, the electronic device 120 or a component thereof (e.g., the data obtainer 442) obtains image data from one or more external facing image sensors 314, wherein the image data corresponds to images or a video stream capturing the physical setting 105. In some implementations, the controller 110 or a component thereof (e.g., the data obtainer 242) obtains image data from the electronic device 120 that includes image data from one or more external facing image sensors 314 of the electronic device 120, wherein the image data corresponds to images or a video stream capturing the physical setting 105. For example, the image data corresponds to images or a video feed from the external-facing cameras on the electronic device 120 (e.g., an HMD, tablet, mobile phone, or the like), cameras within the physical setting 105, or the like. With reference to FIG. 5A, for example, the image data corresponds to a live video feed of a portion of the physical setting 505 associated with the field-of-view 520 of an external facing image sensor of the electronic device 120. In this example, the display 510 of the electronic device 120 shows the image data including the portion of the physical setting 505 that includes the submarine model 512 sitting on the table 514.

As represented by block 8-2, the method 800 includes recognizing a portion of an object within the image data. In some implementations, the controller 110 or a component thereof (e.g., the object recognizer 243) recognizes one or more objects within the image data (e.g., the object 160 within the physical setting 105 in FIGS. 1A-1B). In some implementations, the electronic device 120 or a component thereof (e.g., the optional object recognizer 341) recognizes one or more objects within the image data (e.g., the object 160 within the physical setting 105 in FIGS. 1A-1B). For example, the controller 110 or the electronic device 120 performs object detection and recognition using object/shape classifiers on the image data in order to identify one or more objects. In some implementations, the controller 110 or the electronic device 120 identifies the one or more objects based on depth data in place of or in conjunction to the image data. With reference to FIG. 5A, for example, the controller 110 or the electronic device 120 recognizes the submarine model 512 within the physical setting 505 and optionally also identifies the type of submarine associated with the submarine model 512.

In some implementations, the object corresponds to a scale-model or representation of a real-life object such as a building, landscape, campus, vehicle, or the like. For example, in FIGS. 5A-5B, the recognized object corresponds to the model submarine 512. In some implementations, the object corresponds to a real-life object such as a building, vehicle, ball, toy, furniture, or the like. For example, in FIG. 6A, the recognized object corresponds to the Eiffel Tower 612.

As represented by block 8-3, the method 800 includes obtaining (e.g., receiving, retrieving, or generating) SR content associated with the portion of the object. In some implementations, the controller 110 or a component thereof (e.g., the SR content obtainer 246) obtains the SR content associated with the one or more objects recognized within the image data.

In some implementations, as represented by block 8-3a, the method 800 includes receiving or retrieving the SR content from a library of SR content associated with the object. In some implementations, the controller 110 or a component thereof (e.g., the SR content obtainer 246) obtains the SR content associated with the one or more objects recognized within the image data from a local library or a remote library (e.g., a remote server, a third-party content provider, or the like). In some implementations, each of the objects recognized within image data are associated with one or more instances of SR content (e.g., educational information, a cross-section thereof, associated video content, and/or the like). With reference to FIGS. 5A-5B, for example, the electronic device 120 superimposes the AR content 525 and 575 on the model submarine 512 to show a cutaway view of the submarine type.

In some implementations, each of the objects recognized within image data are associated with one or more instances of SR content for respective portions of the objects (e.g., a top portion of an object is associated with first SR content and a bottom portion of the object is associated with second SR content). In some implementations, the controller 110 or a component thereof (e.g., the SR content manager 248) selects from various instances of SR content associated with a respective object recognized within the image data based on the portion of the object within the image data. For example, if a bow portion of a boat is detected within the image data, the electronic device presents SR content associated with the bow. Continuing with this example, however, if an aft portion of a boat is detected within the image data, the electronic device presents SR content associated with the aft.

In some implementations, as represented by block 8-3b, the method 800 includes generating the SR content based on sensor data. In some implementations, the controller 110 or a component thereof (e.g., the SR content obtainer 246) generates the SR content associated with the one or more objects recognized within the image data based on environmental sensor data or sensor data associated with the one or more objects. In some implementations, the SR content is generated as a function of sensors associated with the object (e.g., sensors within a car engine, which in turn lead to AR content providing a live simulation of the car engine). In some implementations, the SR content is generated as a function of environmental sensors proximate to the object (e.g., thermometers, wind gauges, rain gauges, humidity sensors, light sensors, electromagnetic wave sensors, and/or the like). According to some implementations, a user is able to see AR content superimposed on an object that is generated based on sensor data from the object and/or environmental sensors proximate to the object.

With reference to FIG. 6A, for example, the electronic device 120 superimposes the AR content 625a and 625c on the Eiffel Tower 612 corresponding to elevators moving within the Eiffel Tower based on sensor data from the Eiffel Tower 612. With reference to FIG. 6A, for example, the electronic device 120 also displays AR content 625b corresponding to the crowd of people below the Eiffel Tower 612 or environmental statistics (e.g., wind speed, temperature, humidity, etc.) based on sensor data from local sensors or sensors within the physical setting 605. With reference to FIG. 6B, for example, the electronic device 120 superimposes the AR content 675a and 675b on the automobile 662 corresponding to illustrations of the working transmission and engine of the automobile 662 based on sensor data from the automobile 622.

In some implementations, as represented by block 8-3c, the method 800 includes generating the SR content based on video content. In some implementations, the controller 110 or a component thereof (e.g., the SR content obtainer 246) generates the SR content based on video content. With reference to FIGS. 5A-5B, for example, the electronic device 120 superimposes the AR content 525 and 575 on the model submarine 512 to show a cutaway view of the model submarine 512, where the AR content 525 and 575 is based on video content associated with the type of submarine associated with the model submarine 512. With reference to FIG. 7, for example, in state 710 (e.g., at time T), the user 150 is watching video content 705 (e.g., a TV episode or movie associated with a submarine crew) on the display device 130. With continued reference to FIG. 7, in state 720 (e.g., at time T+1), the user 150 is wearing the electronic device 120 (e.g., an HMD) on his/her head and viewing an SR reconstruction 715 of the video content 705 being presented on and/or around the model submarine 160.

As one example, a display device (e.g., TV or tablet) presents a movie associated with a spaceship crew to a user while a physical model of the spaceship is located on the user's coffee table and the user is wearing an AR-enabled HMD with optical see-through. Continuing with this example, in response to a command from the user, playback of the movie on the display device stops and the AR-enabled HMD presents an SR reconstruction of the movie presented on and/or around the physical model of the spaceship. As such, the user is able to seamlessly switch between viewing a movie on a display device and an SR reconstruction thereof superimposed on or around a related physical object or model scene. In some implementations, the SR reconstruction of the video content is obtained (e.g., received or retrieved) from a library of existing SR content. For example, in some implementations, the SR reconstruction of the video content is generated based on the techniques described in U.S. Provisional Patent Application No. 62/620,334, filed Jan. 22, 2018, which is incorporated herein in its entirety.

In some implementations, as represented by block 8-3d, the SR content is selected based on orientation of the device relative to the object. In some implementations, the controller 110 or a component thereof (e.g., the mapper and locator engine 244) determines the orientation of the electronic device 120 relative to one or more reference points (e.g., the object 160) in the physical setting (e.g., the center of mass of the object 160 or another point on the object 160). In some implementations, the electronic device 120 or a component thereof (e.g., the orientation determiner 343) determines the orientation of the electronic device 120 relative to one or more reference points (e.g., an object) in the physical setting (e.g., the center of mass of or another point on the object 160). For example, in some implementations, the orientation of the electronic device 120 is determined relative to the object based on the techniques described in U.S. Provisional Patent Application No. 62/556,849, filed Sep. 11, 2017, which is incorporated herein in its entirety. In some implementations, the controller 110 or a component thereof (e.g., the SR content manager 248) selects from various instances of SR content associated with a respective object recognized within the image data based on the orientation of the electronic device 120 relative to the respective object.

For example, as shown in FIGS. 5A-5B, the AR content changes based on the orientation of the electronic device 120 relative to the object. In FIG. 5A, the electronic device 120 superimposes the AR content 525 on the model submarine 512 based on the side or perspective orientation of the electronic device 120 relative to the model submarine 512. In contrast, in FIG. 5B, the electronic device 120 superimposes the AR content 575 on the model submarine 512 based on the top-down orientation of the electronic device 120 relative to the model submarine 512.

As represented by block 8-4, the method 800 includes displaying the SR content in association with the portion of the object. In some implementations, the controller 110 or a component thereof (e.g., the SR content manager 248) coordinates the presentation of the SR content by the electronic device 120. In some implementations, the controller 110 or a component thereof (e.g., the data transmitter 250) provides presentation data associated with the SR content to the electronic device 120 for presentation thereby. In some implementations, the electronic device 120 or a component thereof (e.g., the SR presenter 344) presents the SR content in association with the object via the one or more displays 312.

In some implementations, the SR content is overlaid or superimposed on the object. In some implementations, the SR content is displayed around or adjacent to the object. In some implementations, once the object is recognized, the electronic device 120 displays a subtle affordance or prompt that is, in turn, selected to initiate presentation of the SR content. In some implementations, the user is also able to select from multiple instances of SR content associated with the recognized object. In some implementations, the SR content is interactive, in which the user is able to interact with the SR content. In turn, the SR content is updated based on the user interactions (e.g., zoom in/out, spin, flip, move, disassemble, reassemble, etc. actions). In some implementations, as the user interacts with the SR content, the electronic device 120 provides audio, haptic, skin shear, temperature, or the like feedback.

In some implementations, as represented by block 8-4*a*, the SR content is superimposed on the object. For example, the SR content is overlaid or superimposed on the object as such the SR content may show a working engine of the object car, multiple decks of the object spaceship, or proposed modifications/additions to the object. In another example, the SR content is displayed transparently to provide an "x-ray" view into the object. With reference to FIGS. 5A-5B, for example, the electronic device 120 superimposes the AR content 525 and 575 on the model submarine 512 to show a cutaway view of the submarine type. In another example, the SR content shows an "x-ray" view of a human body, a container of food, a consumer product, a household appliance, a collectible miniature, or the like (e.g., the recognized object). In yet another example, the SR content corresponds to an original or restored state of an ancient object (e.g., antique furniture, historic relic, ancient ruins, or the like).

In some implementations, as represented by block 8-4*b*, the SR content is displayed around or adjacent to the object. For example, the SR content is displayed around or adjacent to the object such as electromagnetic waves penetrating a building or wind gusts striking a tree or building. With reference to FIG. 6A, for example, the electronic device 120 presented the AR content 625*b* that corresponds to the crowd of people below the Eiffel Tower 612 or environmental statistics (e.g., wind speed, temperature, humidity, etc.) based on sensor data from sensors associated with the electronic device 120, sensors associated with the Eiffel Tower 612, or sensors within the physical setting 605.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a computing system including non-transitory memory and one or more processors, wherein the computing system is communicatively coupled to a display device, one or more input devices, and an image sensor:
   obtaining, via the image sensor, image data associated with a physical setting;
   recognizing a physical object within the image data associated with the physical setting;
   determining a camera pose associated with the image data relative to the recognized physical object;
   in accordance with a determination that the camera pose corresponds to a first point-of-view of the physical object from a first orientation:
      obtaining a first synthesized reality (SR) object that corresponds to the first point-of-view of the physical object from the first orientation; and
      causing presentation of the first SR object in association with the physical object via the display device; and
   in accordance with a determination that the camera pose corresponds to a second point-of-view of the physical object associated with a second orientation different from the first orientation:
      obtaining a second SR object associated with the physical object that corresponds to the second point-of-view of the physical object from the second orientation, wherein the second SR object is different from the first SR object; and
      causing presentation of the second SR object in association with physical object via the display device.

2. The method of claim 1, wherein the first and second SR objects are overlaid or superimposed on at least a portion of the physical object.

3. The method of claim 1, wherein the first and second SR objects are displayed around or adjacent to at least a portion of the physical object.

4. The method of claim 1, wherein the first and second SR objects are obtained from a library of existing SR content associated with the physical object.

5. The method of claim 4, wherein the first and second SR objects are selected from the library of existing SR content associated with the physical object based on the camera pose relative to the physical object.

6. The method of claim 1, wherein the first and second SR objects are generated based on sensor data associated with the physical object.

7. The method of claim 1, wherein the first and second SR objects are generated based on video content associated with the physical object.

8. The method of claim 1, further comprising:
   in response to obtaining the first SR object, causing presentation of an affordance provided to initiate display of the first SR object via the display device, wherein the first SR object is displayed in association with the physical object in response to detecting selection of the affordance.

9. The method of claim 1, wherein the first SR object corresponds to a first cutaway visualization of the physical object from the first orientation, and wherein the second SR object corresponds to a second cutaway visualization of the physical object from the second orientation.

10. The method of claim 9, wherein the first cutaway visualization corresponds to a first live video feed of at least a first portion of the physical object from the first orientation, and wherein the second cutaway visualization corresponds to a second live video feed of at least a second portion of the physical object from the second orientation.

11. The method of claim 9, wherein the first cutaway visualization is based on first live sensor data associated with at least a first portion of the physical object from the first orientation, and wherein the second cutaway visualization is based on second live sensor data associated with at least a second portion of the physical object from the second orientation.

12. The method of claim 1, wherein the first and second SR content correspond to one of a cross-sectional visualization, educational information, or video content associated with the physical object.

13. The method of claim 1, wherein the first point-of-view of the physical object from the first orientation corresponds to a side view of the physical object, and wherein the second point-of-view of the physical object from the second orientation corresponds to a top-down view of the physical object.

14. A computing system comprising:
   one or more processors;
   a non-transitory memory;
   an interface for communicating with a display device, one or more input devices, and an image sensor; and
   one or more programs stored in the non-transitory memory, which, when executed by the one or more processors, cause the computing system to:
      obtain, via the image sensor, image data associated with a physical setting;
      recognize a physical object within the image data associated with the physical setting;
      determine a camera pose associated with the image data relative to the recognized physical object;
      in accordance with a determination that the camera pose corresponds to a first point-of-view of the physical object from a first orientation:
         obtain a first synthesized reality (SR) object that corresponds to the first point-of-view of the physical object from the first orientation; and
         cause presentation of the first SR object in association with the physical object via the display device; and
      in accordance with a determination that the camera pose corresponds to a second point-of-view of the physical object associated with a second orientation different from the first orientation:
         obtain a second SR object associated with the physical object that corresponds to the second point-of-view of the physical object from the second orientation, wherein the second SR object is different from the first SR object; and
         cause presentation of the second SR object in association with physical object via the display device.

15. The computing system of claim 14, wherein the first and second SR objects are overlaid or superimposed on at least a portion of the physical object.

16. The computing system of claim 14, wherein the first and second SR objects are generated based on sensor data associated with the physical object.

17. The computing system of claim 14, wherein the first and second SR objects are generated based on video content associated with the physical object.

18. The computing system of claim 14, wherein the one or more programs further cause the computing system to:

in response to obtaining the first SR object, cause presentation of an affordance provided to initiate display of the first SR object via the display device, wherein the first SR object is displayed in association with the physical object in response to detecting selection of the affordance.

19. The computing system of claim 14, wherein the first SR object corresponds to a first cutaway visualization of the physical object from the first orientation, and wherein the second SR object corresponds to a second cutaway visualization of the physical object from the second orientation.

20. The computing system of claim 19, wherein the first cutaway visualization corresponds to a first live video feed of at least a first portion of the physical object from the first orientation, and wherein the second cutaway visualization corresponds to a second live video feed of at least a second portion of the physical object from the second orientation.

21. The computing system of claim 19, wherein the first cutaway visualization is based on first live sensor data associated with at least a first portion of the physical object from the first orientation, and wherein the second cutaway visualization is based on second live sensor data associated with at least a second portion of the physical object from the second orientation.

22. The computing system of claim 14, wherein the first and second SR content correspond to one of a cross-sectional visualization, educational information, or video content associated with the physical object.

23. The computing system of claim 14, wherein the first point-of-view of the physical object from the first orientation corresponds to a side view of the physical object, and wherein the second point-of-view of the physical object from the second orientation corresponds to a top-down view of the physical object.

24. The computing system of claim 14, wherein the first and second SR objects are displayed around or adjacent to at least a portion of the physical object.

25. The computing system of claim 14, wherein the first and second SR objects are obtained from a library of existing SR content associated with the physical object.

26. The computing system of claim 25, wherein the first and second SR objects are selected from the library of existing SR content associated with the physical object based on the camera pose relative to the physical object.

27. A non-transitory method storing one or more programs, which, when executed by one or more processors of a computing system with an interface for communicating with a display device, one or more input, devices, and an image sensor, cause the computing system to:
  obtain, via the image sensor, associated with a physical setting:
  recognize a physical object within the image data associated with the physical setting;
  determine a camera pose associated with the image data relative to the recognized physical object;
  in accordance with a determination that the camera pose corresponds to a first point-of-view of the physical object from a first orientation:
    obtain a first synthesized reality (SR) object that corresponds to the first point-of-view of the physical object from the first oreintation; and
    cause presentation of the first SR object in association with the physical object via the display device; and
  in accordance with a determination that the camera pose corresponds to a second point-of-view of the physical object associated with the second orientation different from the first orientation:
    obtain a second SR object associated with the physical object that Corresponds to the second point-of-view of the physical object from the second orientation, wherein the second SR object is different from the firist SR object; and
    cause presentation of the second SR object in association with physical object via the display device.

28. The non-transitory method of claim 27, wherein the first and second SR objects are overlaid or superimposed on at least a portion of the physical object.

29. The non-transitory method of claim 27, wherein the first and second SR objects are generated based on sensor data associated with the physical object.

30. The non-transitory method of claim 27, wherein the first and second SR objects are generated based on video conntent associated with the physical object.

31. The non-transitory method of claim 27, wherein one or more programs further cause the computing system to:
  in response to obtaining the first SR object, cause presentation of an affordance provided to initiate display of the first SR object via the display device, wherein the first SR object is displayed in association with the physical object in response to detecting selection of the affordance.

32. The non-transitory memory of claim 27, wherein the first SR object corresponds to a first cutaway visualization of the physical object from the first orientation, and wherein the second SR object corresponds to a second cutaway visualization of the physical object from the second orientation.

33. The non-transitory memory of claim 32, wherein the first cutaway visualization corresponds to a first live video feed of at least a first portion of the physical object from the first orientation, and wherein the second cutaway visualization corresponds to a second live video feed of at least a second portion of the physical object from the second orientation.

34. The non-transitory memory of claim 32, wherein the first cutaway visualization is based on first live sensor data associated with at least a first portion of the physical object from the first orientation, and wherein the second cutaway visualization is based on second live sensor data associated with at least a second portion of the physical object from the second orientation.

35. The non-transitory memory of claim 27, wherein the first and second SR content correspond to one of a cross-sectional visualization, educational information, or video content associated with the physical object.

36. The non-transitory memory of claim 27, wherein the first point-of-view of the physical object from the first orientation corresponds to a side view of the physical object, and wherein the second point-of-view of the physical object from the second orientation corresponds to a top-down view of the physical object.

37. The non-transitory memory of claim 27, wherein the first and second SR objects are displayed around or adjacent to at least a portion of the physical object.

38. The non-transitory memory of claim 31, wherein the first and second SR objects are obtained from a library of existing SR content associated with the physical object.

39. The non-transitory memory of claim 38, wherein the first and second SR objects are selected from the library of existing SR content associated with the physical object based on the camera pose relative to the physical object.

* * * * *